United States Patent

Goozner

[11] Patent Number: 5,866,752
[45] Date of Patent: Feb. 2, 1999

[54] DESTRUCTION OF VOLATILE ORGANIC CARBONS

[76] Inventor: Robert E. Goozner, 1511 Exeter Rd., Charlotte, N.C. 28211

[21] Appl. No.: 939,322

[22] Filed: Sep. 29, 1997

[51] Int. Cl.$^6$ .............................. A62D 3/00; B01D 53/00; C07C 17/00; C07B 63/00
[52] U.S. Cl. ................. 588/227; 204/157.3; 204/157.94; 204/158.21
[58] Field of Search ......................... 588/227; 204/157.3, 204/157.94, 158.21

[56] References Cited

U.S. PATENT DOCUMENTS

| | | | |
|---|---|---|---|
| 4,966,665 | 10/1990 | Ibuski et al. ........................... | 204/157.3 |
| 5,045,288 | 9/1991 | Raupp et al. ......................... | 422/186.3 |

*Primary Examiner*—Kathryn Gorgos
*Assistant Examiner*—Edna Wang
*Attorney, Agent, or Firm*—Robert E. Goozner

[57] ABSTRACT

A method for removing VOCs from a gas stream comprising irradiating the gas stream in intimate contact with a semiconductor catalyst under laminar flow conditions. The catalyst can be chosen from a wide range of semiconductor materials, including naturally occurring chalcopyrites, synthetic chalcopyrites, CdTe, CdS, $CuInSe_2$, CuS, $FeS_2$, $CuFeS_2$, Si, GaAs, GaSb, GaPS, ZnS, GaInP, and $As_2S_3$. This process can be performed in a fluidized bed, in a tube reactor or in an irradiated reactor packed with catalyst adhering to a light conducting fibrous substrate. The method is capable of being practiced in a passive manner in a module have no moving parts and no requirement for routine maintenance or replenishment of reagents.

22 Claims, 7 Drawing Sheets

DESTRUCTION OF VOLATILE ORGANIC CARBONS

BACKGROUND

1. Field of Invention

This invention relates to a method to remove volatile organic carbons from gas streams.

2. Description of Prior Art

Industrial operations emit an enormous amount of hazardous air pollutants (HAPs) into the atmosphere each year. A large fraction of these HAPs are volatile organic carbons (VOCs) required for emission control by Clean Air Act Amendments of 1990 and state regulations. VOCs are also referred to as volatile organic compounds, volatile organic chemicals, or volatile oxidizable carbons. VOCs have gained prominence in air and water pollution control practice over the past decade as a result of heightened environmental and health concerns and the introduction of new regulations. VOCs are precursors of ground-level ozone, which contributes to smog formation. The overall chemistry is a complex interaction between VOCs, NOx and ozone which results in the formation of photochemical smog. Conventional technologies such as incineration and thermocatalytic oxidation are usually found to be expensive to implement and have a tendency to result in secondary pollution. Small emitters of VOCs such as dry cleaners, bakeries, restaurants and microbreweries are also coming under environmental scrutiny, especially in such environmentally sensitive areas as the South Coast Air Quality Management District in Southern California. Other sources of VOCs can include waste water treatment plants, light manufacturing and small businesses using solvents such as cabinet makers and musical instrument repair shops. Even an artist studio is a potential point source of VOCs due to the solvents used in paint, shellac, etc. The result is an urgent need to develop small and relatively inexpensive methods to eliminate VOCs from these point sources.

Different types of industrial operations and small businesses emit different types of VOCs. A bakery or brewery will emit ethanol. A dry cleaner will emit halogenated compounds such as terachloroethylene or clear petroleum distillate (Stoddard Solvent). Light manufacturing will emit solvent fumes such as methyl ethyl ketone (MEK) or toluene. Even a seemingly environmentally benign business as a greenhouse can emit a significant amount of terpenes, which can function as a greenhouse gas. Paint spray booths and adhesive tape manufacturers can emit significant amounts of aromatic solvents. A robust method to eliminate VOCs will also have military uses such as being mounted on the air inlet vents of a naval vessel to destroy nerve gas or biological agents during an attack.

DESCRIPTION OF THE PRIOR ART

A typical system to destroy VOCs has been installed at the General Dynamics facility in Rancho Cucamonga, Calif. (Ozone—The Problem and the Solution, Pollution Engineering, June 1991, p. 62) to treat the off-gas from paint spray booths. The VOC stream from the paint spray booth is routed to a reaction chamber where the VOCs are irradiated with ultraviolet light in the presence of ozone. The gas stream exiting the photolytic reactor contains ozone and unreacted VOCs which must be adsorbed by a carbon adsorption unit. Two carbon adsorption units must be used in a parallel configuration where one is in use while the other is being regenerated. This type of system is suitable for a large VOC point source but is too bulky and complicated to be utilized by small VOC generators such as dry cleaners, bakeries and restaurants.

Reimers et al. (Covering All The Bases: A New Technology Cleans Up a 50-Year-Old "Soup" of Volatile Organic Compounds at McClennen Air Force Base In Sacramento, Calif., Environmental Protection, April 1996, p. 42) discusses the utilization of SPDT, silent plasma discharge technology, developed at Los Alamos National Laboratory, for the destruction of VOCs. SPDT incinerates VOCs in a plasma flame of up to 1,500° F. in a technology which, if suitable for large scale VOC remediation, is unsuitable for small scale applications. Another large scale application is discussed by Draves (Destroying VOCs and Looking to the Future, Environmental Protection, July 1996, p.36) where a catalytic oxidizer is used to remediate a VOC stream emanating from a printing plant. The catalyst enables a running temperature as low as 650° F. for a large scale application of 8,000 standard cubic feet per minute (SCFM). Regenerative catalytic oxidation is discussed by Chen (Lower Operating Temperatures Oxidize VOCs, Pollution Engineering, December 1996, p. 42) where a precious metal catalyst is used. However temperatures of up to 800° F. are required in a large complicated unit unsuitable for most small applications.

Biofiltration offers method to treat VOCs, as reported by Standefer (Evaluating Biofiltration, Environmental Technology, July/August 1996, p.26). Biofiltration entails passing the gas stream through a mixture of inorganic plastic beads, organic compost and nutrients. The beads are for enhancing air distribution, reducing compacting and lengthening bed life. The drawback of biofiltration is the large scale of the technology. A biofiltration unit which handles 140,000 SCFM occupies several acres of space, a scale unsuitable for small business applications.

Ibbetson et al. (Cryogenic Condensation Puts a Chill on VOCs, Pollution Engineering, September 1997, p.56) explores the possibility of low temperature condensation of VOCs wherein dual process condensers cooled by vaporized liquid nitrogen are used to condense VOCs so they can be removed as liquids. The prospect of using this technology for small applications is hampered by the need to constantly replenish liquid nitrogen in a storage tank. Most small users of technology will prefer a method as simple and maintenance-free as possible.

A simple method to destroy VOCs in gas streams at ambient temperature is the basis of my invention. It entails the intimate contact of the VOC molecule with a photon of ultraviolet radiation in the presence of a semiconductor catalyst. Under certain conditions, this method will also be applicable to liquid streams.

A search of the patent literature revealed that there are patents specifically directed at destroying airborne pollutants and VOCs. I am aware of the following pertinent patents on the destruction of VOCs.

| PATENT NO. | AUTHOR | ISSUE DATE | TITLE |
|---|---|---|---|
| 4,416,748 | Stevens | Nov. 22, 1983 | Method for Reduction of the Content of SO2 and/or NOx in Flue Gas |

-continued

| PATENT NO. | AUTHOR | ISSUE DATE | TITLE |
| --- | --- | --- | --- |
| EP App. 88108409.9 | Kawamura, et al. | July 12, 1988 | An Exhaust Gas Treatment Process Using Irradiation and Process For Using the Same |
| EP App. 88309759.4 | Zeff, et al. | April 4, 1990 | Decomposition of Volatile Organic Halogenated Compounds Contained in Gases and Aqueous Solutions |
| 4,780,287 | Zeff, et al. | Oct. 25, 1988 | Decomposition of Volatile Organic Halogenated Compounds Contained in Gases |
| 5,045,288 | Raupp, et al. | Sept. 3, 1991 | Gas-solid Photocatalytic Oxidation of Environmental Pollutants |
| 5,130,031 | Johnston | July 14, 1992 | Method of Treating Aqueous Liquids Using Light Energy, Ultrasonic Energy, and a Photocatalyst |
| 5,163,626 | Urwin, et al. | Nov. 17, 1992 | Destruction Process |
| 5,308,458 | Urwin, et al. | May 3, 1994 | Destruction Process |
| 5,330,661 | Okuda, et al. | July 19, 1994 | Process and Apparatus for the decomposition of Organochlorine Solvent Contained in Water |
| 5,564,065 | Fleck, et al. | Oct. 8, 1996 | Carbon Monoxide Air Filter |
| 5,604,339 | Tabatabaie-Raissi et al. | Feb. 18, 1997 | Method of Photocatalytic Destruction of Harmful Volatile Compounds at Emitting Surfaces |

Stevens, U.S. Pat. No. 4,416,748 teaches a method where the content of $SO_2$ and/or NOx in flue gas is reduced by irradiating the gas with in admixture with $NH_3$ with ultraviolet light at wavelengths between 170 and 220 nanometers. The destruction of VOCs and use of a catalyst is not addressed in this patent. Kawamura, et al., EP App. 88108409.9 uses an electron beam in an analogous type of system to treat $SO_2$ and NOx.

Zeff et al., U.S. Pat. No. 4,780,287, EP Appl. 88309759.4, teaches a process and apparatus where a stream of gas carrying volatile organic halogenated compounds is passed through a bed of silica gel or quartz chips, and the bed is thereafter irradiated with ultraviolet light. The use of hydrogen peroxide or ozone injection is also used in order to promote the efficiency of the process. This process does not use a semiconductor catalyst and requires a strong oxidizing agent, such as hydrogen peroxide or ozone, to accomplish the decomposition. This process is also a "wet" process designed for a flowing aqueous system.

Raupp et al., U.S. Pat. No. 5,045,288 teaches a process where, at ambient temperature, ultraviolet illuminated catalyst, such as titanium dioxide, in the presence of moist air substantially destroys trichloroethylene type materials in a gaseous phase. This patent utilizes only oxide catalysts and requires a very precise modulation of the water vapor content. No practical photocatalytic reactor configurations are taught which would enable the placement of photocatalytic remediation technology in the reach of small VOC producers.

Johnston, U.S. Pat. No. 5,130,031 teaches a process for removing halogenated organic compounds from contaminated aqueous liquids which comprises contacting the contaminated liquid with a catalyst while simultaneously exposing the contaminated liquid to both acoustic energy and light energy to decompose halogenated organic compounds. This process is for aqueous systems and requires the addition of acoustic energy to augment the decomposition efficiency.

Urwin, et al., U.S. Pat. No. 5,308,458 teaches a process for the decomposition of photocatalytically degradable organic material which includes exposing the organic material to ultraviolet light as the material is passing across the surface of a spinning disc. The surface of the disc carries anatase titanium dioxide adhering to the disc. Urwin, et al., U.S. Pat. No. 5,163,626 teaches a process for the decomposition of photocatalytically decomposable organic material which includes exposing the organic material to ultraviolet light as the material is being passed across the surface of a spinning disc. The organic material is in the form of a liquid dispersion which also contains titanium dioxide, which acts as a catalyst in the decomposition process. The Urwin process is directed at the destruction of VOCs in liquids and requires a spinning disc configuration, which is not amenable to a VOC remediation system were simplicity and a minimum of moving parts is desired.

Okuda et al., U.S. Pat. No. 5,330,661 teaches a process in which organochlorine solvent contained in water is decomposed by adding at least one of hydrogen peroxide and ozone to the water and then radiating ultraviolet rays to the water. According to the invention, a catalytic amount of a water insoluble barium titanate substance is caused to co-exist in the water. Okuda does not address the gas phase destruction of VOCs.

Fleck, et al., U.S. Pat. No. 5,564,065 teaches a method where a reaction chamber is filled with a fine fibrous material capable of holding powdered anatase titanium dioxide. Embedded in the fibrous mesh is a source of ultraviolet light that is used to photo-excite the titanium dioxide. Air containing carbon monoxide is passed through the reaction chamber, and carbon monoxide is oxidized and passes out of the filter. The patent does not, however, teach the destruction of VOCs using their method.

Tabatabaie-Raissi et al., U.S. Pat. No. 5,604,339 teaches a method where a formaldehyde laden wooden substrate is treated with a $TiO_2$ solution to form a thin veneer on the surface. This layer acts like a membrane preventing outward transport of formaldehyde and other harmful compounds while photocatalytic destruction of the formaldehyde is achieved. This patent prevents the generation of VOCs but does not show how to achieve the photocatalytic destruction of VOCs in gas streams.

OBJECTS AND ADVANTAGES

The principal object of the invention is to provide a simple and efficient method to remove and destroy halogenated and nonhalogenated VOCs from air and gas streams.

A further object of this invention is to accomplish the destruction of VOCs by irradiating them when they are in the immediate vicinity of a semiconductor catalyst.

Another object of this invention is to provide a method to destroy halogenated and nonhalogenated VOCs by irradiating the gas or stream while passing through a fluidized bed of catalyst particles.

Another object of this invention is to provide a method to destroy halogenated and nonhalogenated VOCs by irradiating the gas or liquid stream while passing through a glass or quartz tube coated with catalyst.

Another object of this invention is to provide a method to destroy halogenated and nonhalogenated VOCs in a system where the off-gas stream from a small point source is in contact with a catalyst while being passed through a manifold of glass or quartz tubes being exposed to ultraviolet light or sunlight.

Another object of this invention is to provide a method to destroy halogenated and nonhalogenated VOC's by irradiating the gas stream while passing through a packed bed of beads coated with catalyst particles.

DRAWING FIGURES

DETAILED DESCRIPTION

Figure 1:
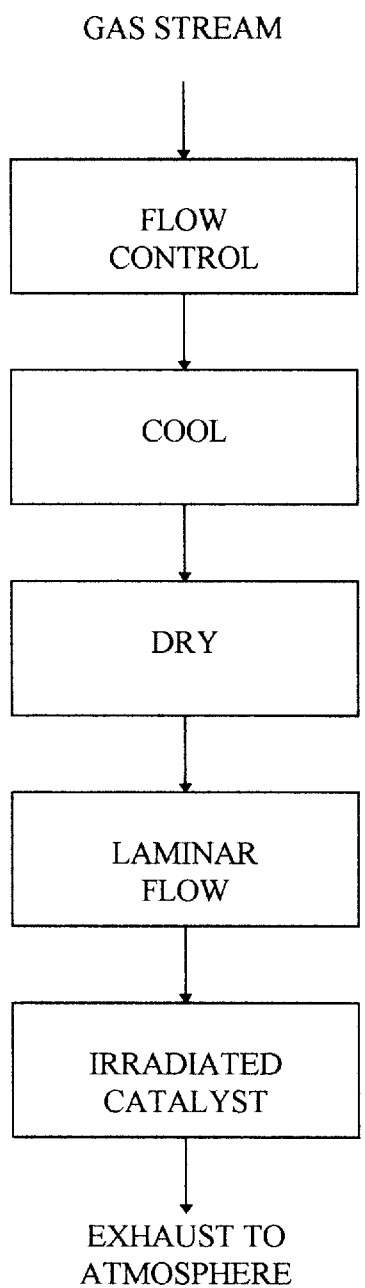
FIG. 1 shows a flow diagram of the VOC destruction process.

FIG. 1 is a process flow diagram of the preferred configuration of the VOC destruction process. The flow of the air must be controlled so that the optimum destruction of VOCs are obtained. The gas flow is then cooled to condense moisture from the gas stream and to lower the temperature of the gas, which will result in a more efficient VOC destruction process. The cooled gas stream is then dried to remove moisture, since excess moisture also tends to interfere with the VOC destruction process. It is preferred that the gas stream be cooled before it is dried. Flow control, however can be placed at any point in the system. It is preferred to put the flow control device at the beginning of the process, since it is then easier to measure and evaluate the pressure drop, using manometers or pressure gauges, across each stage of the process. Laminar flow is induced in the gas stream so that the VOC molecules will have sufficient residence time in the immediate vicinity of an irradiated catalyst particle to initiate the decomposition or oxidation of the VOC molecule. The gas stream is then exposed to the irradiated catalyst for a sufficient time to assure the destruction of the VOC molecules present in the gas stream.

Figure 2:
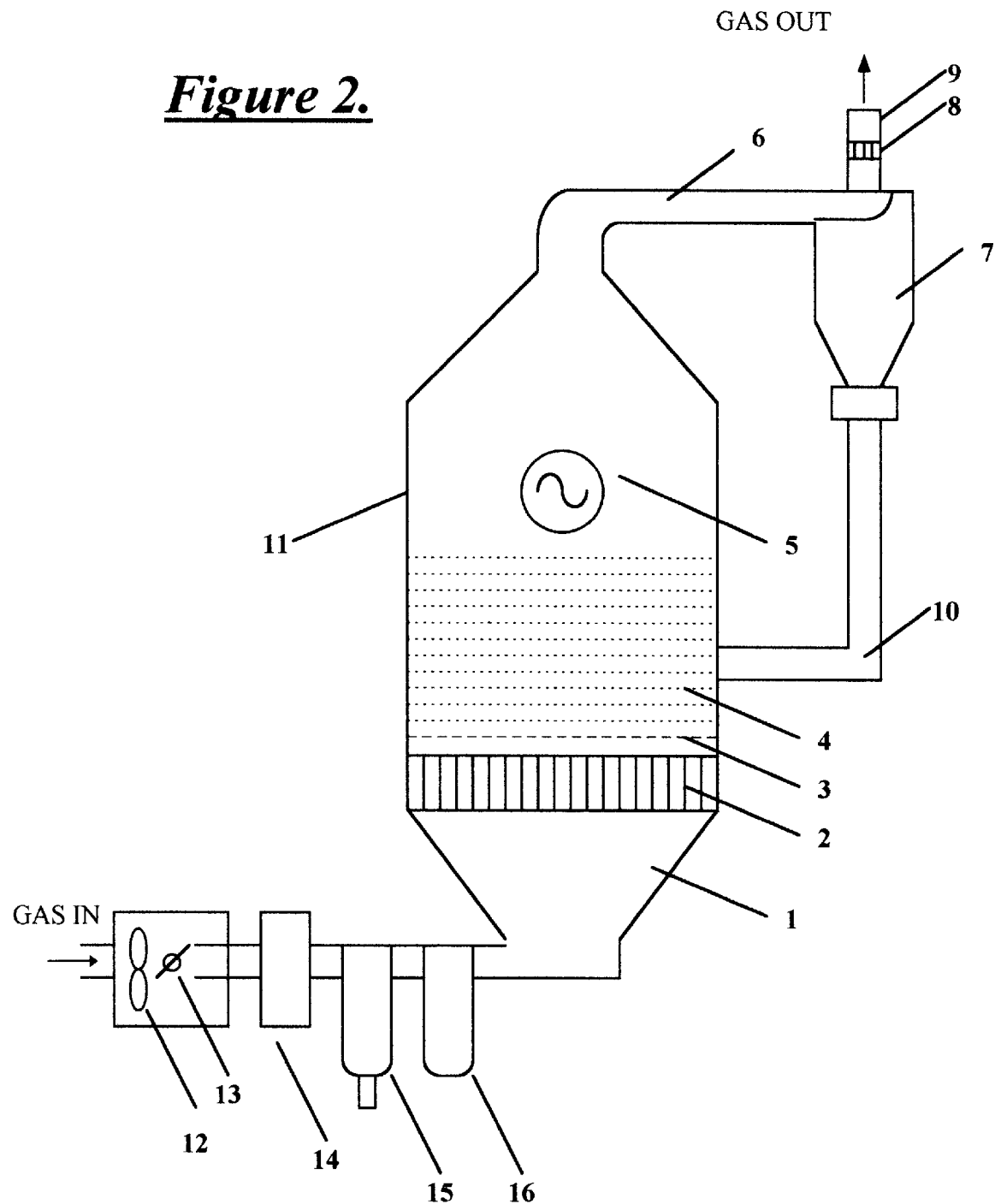
FIG. 2 shows pretreatment options and the destruction of VOCs by irradiating them in a fluidized catalyst bed.

FIG. 2 shows the destruction of VOCs in a fluidized bed configuration. A VOC laden air stream is introduced into a plenum, 1, where the air stream flows through a plurality of tubes, 2, to induce laminar flow conditions.

For the embodiments shown in FIGS. 1 through 7, there are a number of pretreatment options for the air stream before it enters the photocatalytic reactor or plenum of the fluidized bed. Referring to FIG. 2, The velocity of the air stream can be adjusted using either a fixed speed or variable speed fan, 12. An adjustable baffle, 13, can also be used to adjust the gas stream velocity. Another approach to producing a uniform gas flow to the photocatalytic reactor would be to use conventional compressed air technology where the gas is compressed using a pump and stored in a storage tank, also referred to as a ballast. The pressure of the gas in the ballast is usually approximately 80 psi. The gas is then released at a constant rate or pressure to the photocatalytic reactor using a pressure regulator.

Another pretreatment option would be to cool the gas stream using a heat exchanger, 14. The conversion of light to electricity is more efficient at lower temperatures, and the destruction of the VOCs would be more efficient at lower temperatures. The preferred heat exchange option would be to use an electrically powered thermoelectric cooler such as those manufactured by Melcor in Trenton, N.J. or by Marlow Industries in Dallas, Tex. Cooling can also be performed using a compressor such as those commonly used in air conditioning and refrigeration devices.

Another pretreatment option is to dry the gas stream in a dryer, 15. The gas stream can be dried using a coalescer, a desiccant bed, or combinations of coalescers and desiccant beds, or a train of coalescers and desiccant beds. It is advantageous to dry the gas stream since water vapor is a poor transmitter of ultraviolet light and dissipates electric charges.

When the gas stream is to be both cooled and dry, it would be preferable to perform the cooling before the drying. The cooling will cause moisture to condense from the gas stream, and condensed moisture can be captured in a coalescer. Capturing moisture in a coalescer is preferable to drying the gas stream in a desiccant bed, since the desiccant must be periodically replaced, whereas a coalescer must only be occasionally drained. It is believed that the presence of water vapor will promote the destruction of VOCs in the photocatalytic reactor. However, an excess of water vapor will coat the catalyst and inhibit the reaction. The preferred drying approach would be to use only the coalescer, which would remove excess water vapor, while leaving sufficient water vapor in the gas stream to promote the efficient destruction of VOCs.

As another pretreatment option, the gas stream can be prefiltered, 16, before entering the fluidized bed. An example of a prefilter would be a 10 inch filter housing fitted with a spun woven polypropylene filter such as a PALL PROFILE filter having a pore size rating between 1 and 20 microns.

Referring to FIG. 2, tubes, 2, having an inner diameter of up to approximately ¼ inch are usually sufficient to cause laminar flow. Depending on the gas flow and geometry, other tube diameters can be used, where the trade-off is between the tube inner diameter and the tube length where a larger tube diameter requires a longer tube length to induce laminar flow.

Referring to FIG. 2, the air stream exits from tubes and enters the fluidized bed, 4, through a gas distributor, 3. The gas distributor can have a number of configurations, such as concentric rings in the same plane, concentric rings in the form of a cone, grids of T-bars or other structural shapes, flat metal perforated plates, and dished or perforated plates concave both upward or downward. An alternative or supplement to the gas distributor would be a layer of filter medium. A porous stainless steel filter medium such as that manufactured by Pall Corporation would be preferred since stainless steel does not degrade in the presence of ultraviolet light. Other filter media which can be used include those made from ultraviolet resistant polymers such as tetrafluorethylene fluorocarbon polymers, polyvinylidene difluoride (PVDF) and polypropylene. The total pressure drop across the gas distributor should be at least 30% of the total bed pressure drop.

Referring to FIG. 2, the fluidized bed, 4, comprises catalyst particles suspended in the gas stream. The size of the solid particles suspended in the fluidized bed can vary in size between less than 1 micron to 2.5 inches. It is generally concluded that particles distributed in size between 65 mesh and 10 microns are the best for smooth fluidization (least formation of large bubbles). Large particles cause instability and result in slugging or massive surges. Small particles less than 10 microns in size act as though damp, via adhesion forces forming agglomerates or fissures in the bed or spouting. Adding finer sized particles to a coarse bed or coarser sized particles to a bed of fines usually results in better fluidization. The formation of bubbles in the fluidized bed can also be inhibited by vibrating the bed. The vibration can be applied by using a piezoelectric crystal or a mechanical vibrator. I have vibrated small, approximately 1 inch diameter, fluidized beds using the tip of an electric engraver, Vibro-Graver Model V-74 manufactured by Burgess Vibrocrafters, taped to the bed housing. Ultrasound can also be used to prevent the formation of bubbles in the fluidized bed. If bubbling does occur, the depth of the fluidized must be increased so that the gas will have sufficient residence in non-bubble areas for sufficient time for the VOC destruction reaction to occur. The upward velocity of the gas is usually between 0.5 and 10 ft./sec.

The catalyst utilized in all the embodiments of the invention can be anatase titanium dioxide or any other appropriate semiconductor material. These semiconductor materials can include naturally occurring pyrites, synthetic pyrites, naturally occurring chalcopyrites, synthetic chalcopyrites, CdTe, CdS, CuInSe$_2$, CuS, FeS$_2$, CuFeS$_2$, Si, GaAs, GaSb, GaPS, ZnS, GaInP, and As$_2$S$_3$. Using a mixture of semiconductor catalysts will also be advantageous, especially where a number of different wavelengths of light are available to be exploited. For example a mixture of TiO$_2$, CdTe and GaSb would be highly effective in sunlight, where the TiO$_2$ is most sensitive to ultraviolet wavelengths, the CdTe is most sensitive to visible wavelengths and GaSb is sensitive to infrared wavelengths, all which are available in the solar spectrum. Other oxide catalysts can also be utilized, such as zirconium oxide, antimony oxide, zinc oxide, stannic oxide, cerium oxide, tungsten oxide, hematite and goethite. However, it should be noted that metal oxides frequently function as oxidizing agents and pH modifiers, especially when excess moisture or a reduced species such as CO is present. The disadvantage of using a metal oxide for a catalyst is the potential for it to behave as a consumable reagent and not as a catalyst. Barium titanate can also be utilized as a catalyst.

The fluidized bed, 4, is irradiated by an ultraviolet lamp, 5, at one of the commercially available ultraviolet frequencies, which can include sources at 215 nm, 254 nm or 650 nm. Low pressure mercury arc lamps can be used, which provide a strong emission lines at 185 and 254 nanometers. High pressure short arc mercury-xenon lamps will provide a continuous ultraviolet spectrum between 190 nanometers and 300 nanometers. An alternative to the ultraviolet lamp would be to manufacture the housing, 11, of the fluidized bed from a transparent material so that sunlight or some other source of radiant energy can be utilized. Many of the catalyst are active at visible and even infrared wavelengths, and it is possible to use many different types of light sources. The housing can be made of material transparent to ultraviolet light such as quartz or a suitable polymer. Since this invention will be used on the rooftops of dry cleaners, restaurants and other small businesses producing VOCs, it is rational to utilize every available source of ultraviolet radiation. The fluidized bed should be sufficiently large to provide adequate residence time for the destruction of the VOCs in the gas stream. The purified gas stream will exit the fluidized bed through a conduit, 6, to a cyclone, 7, where any catalyst suspended in the gas stream will be routed back to the fluidized bed through the solids pipe, 10. There are a number of cyclone arrangements capable of performing the solids return function, and they are shown in Fig. 20-90 of Chapter 20 of Perry's Chemical Engineering Handbook, 6th Ed. McGraw, Hill, 1984. The purified air or gas stream is discharged through the exhaust pipe, 9. A layer of filter medium, 8, is used to prevent any of the catalyst from exiting with the exhaust gas. A porous stainless steel filter medium such as that manufactured by Pall Corporation would be preferred since stainless steel does not degrade in the presence of ultraviolet light. Other filter media which can be used include those made from ultraviolet resistant polymers such as TEFLON, PVDF, and polypropylene. If there is any residual ozone in the exhaust gas, then the ozone can be destroyed by using an activated carbon bed, silica bed or one of the commercially available ozone destroying devices such as those manufactured by Engelhard Corp., Iselin, N.J..

Figure 3:
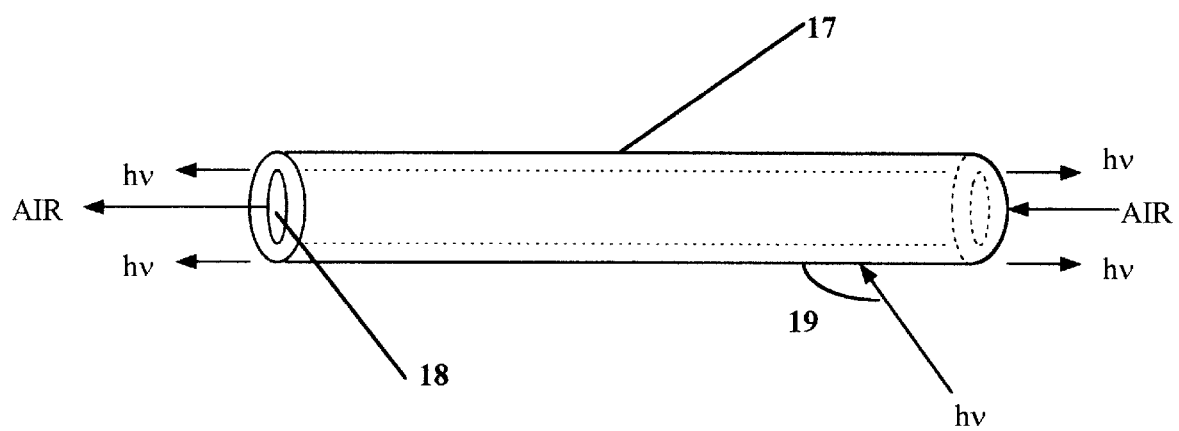
FIG. 3 shows the destruction of VOCs in a light transmitting tube being irradiated so that light is being conducted through the body of the tube.

FIG. 3 shows an embodiment of the invention practiced using a tube, 17, capable of transmitting visible or ultraviolet light. Although the tube can be comprised of clear plastic, soda lime glass or borosilicate glass, the preferred material of construction is quartz, which is transparent to ultraviolet light. The inner diameter, 18, of the tube is sufficiently narrow to induce laminar flow to the gas stream passing through the tube. An inner diameter of ¼ inch is sufficient to induce laminar flow conditions. Laminar flow can also be induced in the gas stream before it enters the tube. An inner diameter of ¼ inch not only forces laminar flow conditions but also allows penetration of the ultraviolet light through the entire diameter of the tube even when the tube is carrying a water stream and not a gas stream. Ultraviolet light is projected at the tube at an angle of incidence, 19, which results in the light being transmitted through the length and diameter of the tube. This angle of incidence can be determined empirically for any given system by varying the angle of the glass tube to the incident collimated light beam until the tube is observed to light up and transmit a light beam through the end of the tube. The interior surface of the tube is in contact with the semiconductor catalyst by adhesion, bonding or embedding of the catalyst with the tube. This type of configuration fulfills the requirement that the VOC molecule be brought into intimate contact with an irradiated semiconductor catalyst particle.

Figure 4:
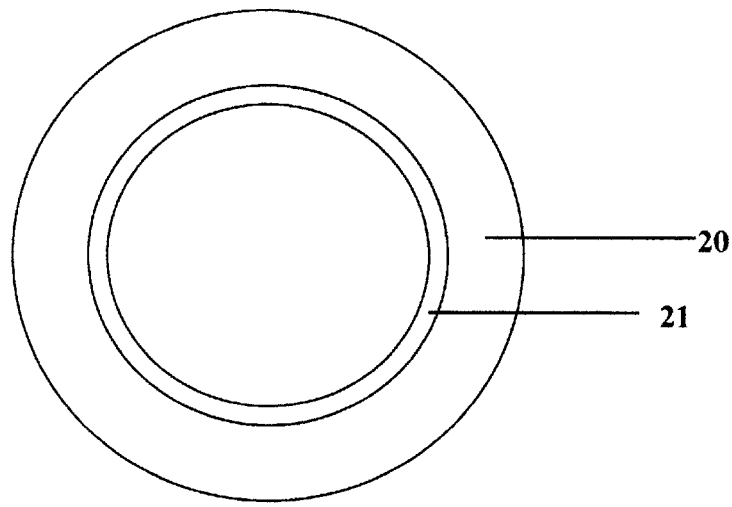
FIG. 4 shows a light transmitting tube with a thin film of semiconductor material coating the inside of the tube.

FIG. 4 shows a cross section of the light transmitting tube, 20, with one arrangement of contacting the catalyst with the light transmitting tube. The catalyst is coated on the tube as a smooth layer, 21. One method of applying the semiconductor catalyst is through chemical vapor deposition, CVD, a well known method of applying a thin layer of a semiconductor, or metalorganic chemical vapor deposition, MOCVD. In MOCVD, a metal organic of one element and the hydride of the other element are mixed in the vapor phase. Pyrolysis on the heated substrate yields a thin film of the desired semiconductor compound. The general equation for the most common class of MOCVD reactions is $$R_nM + XH_n = MX + nRH$$

where R is an organic radical, M and X are the components of the resultant semiconductor, and n is an integer. Examples of MOCVD are

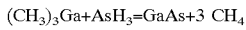

and

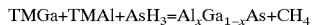

where TMGa is trimethyl gallium and TMAl is trimethylaluminum. Reaction temperatures are in the range of 600° C. and 750° C., which is well below the softening point of borosilicate glass, soda lime glass and quartz.

Another method of applying the thin layer of catalyst would be by dissolving the catalyst in a lixivant such as nitric acid. Nitric acid readily dissolves semiconductors such as pyrites, chalcopyrites, metal sulfides, CdTe and $CuInSe_2$. The inside of the tube is filled or wetted with the lixivant/semiconductor solution, and then the solution is evaporated to leave a thin layer of the catalytic material. If the catalyst is in oxide form, it can be readily reduced to the active metal by heating in a hydrogen or other reducing atmosphere. Still other materials, such as selenium dioxide, are soluble in alcohol or other organic matrices. For example, oxides of tellurium are soluble in ethylene glycol. S. Badesha, U.S. Pat. No. 4,530,718, Jul. 23, 1985 and U.S. Pat. No. 4,548,800, Oct. 22, 1985 elucidates the synthesis of organoesters of Se, Te and As and the subsequent reduction of the organoesters back to the metallic state using hydrazine or other reducing agents. These liquid organometallic complexes can be used to coat the glass, the solvent can be evaporated, and the residue be reduced by roasting under a reducing atmosphere or treated with some other reducing agent to yield a smooth layer of semiconductor catalyst on the tube.

Figure 5:
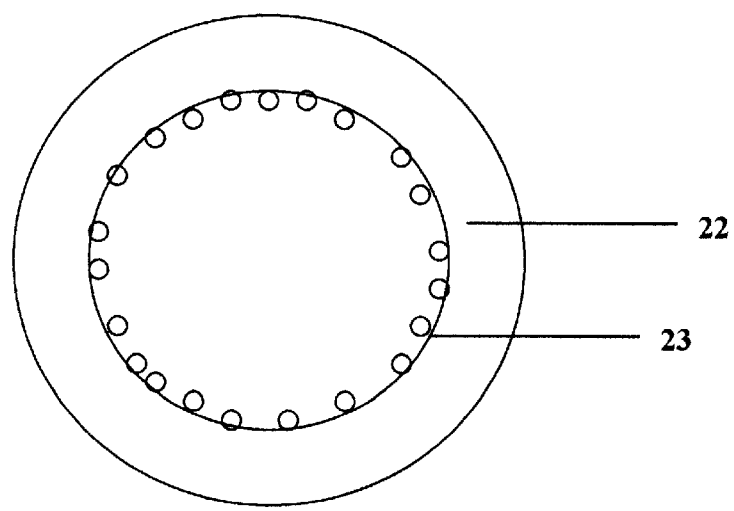
FIG. 5 shows a light transmitting tube with a coating of fine catalyst particles adhering to the inside surface of the tube.

FIG. 5 shows the invention wherein the semiconductor catalyst comprises particles of the semiconductor catalyst, 23, in contact with the light transmitting tube, 22. These particles are in direct contact with the tube and adhere due to the natural adhesive forces associated with the particles, especially particles less than 100 microns in diameter. Very fine particles less than 1 micron in size have especially high adhesion forces and can only be removed from a surface by physical methods such as polishing. The particles can also be glued to the side of the tube by a polymer that can transmit ultraviolet light, these polymers usually being an acrylic or a methacrylic polymer or copolymer.

A preferred method of assuring an intimate contact of the catalyst with the tube would be to pack the tube with powdered catalyst, raise the temperature up to the sintering point of the catalyst or the softening point of the tube, and then allowing the tube to cool at a rate to maintain the temper of the tube. This would assure that a substantial portion of the catalyst particles are embedded in the tube matrix, thereby assuring that there is sufficient irradiation of the catalyst. When the tubing is made from glass or quartz, there will also be chemical bonds between the metals in the catalyst and the silicon molecules in the tube. When the tube is made from a light conducting polymer, there will be primarily an embedding of the catalyst in the tube. The optimal arrangement of the catalyst and tube will be that which yields the maximum number of point charges available to destroy VOC molecules when the tube is either irradiated with or transmitting the appropriate wavelength of light. The tube must be either sufficiently narrow or sufficiently long so that the probability that every VOC molecule, or the majority of VOC molecules, will enter into the immediate vicinity of an activated catalyst site will approach unity.

The thickness of the semiconductor layer depends on both the material and wavelength of light. Mazer (J. Mazer, Solar Cells, An Introduction to Photovoltaic Technology, Kluwer Academic Publishers, Norwell, Mass., 1997, p. 17) gives the depth as equal to $1/\alpha$, where $\alpha$ is the absorption coefficient, and where $a=\alpha(\lambda)$ is the wavelength dependent absorption coefficient, a, as a function of wavelength, $\lambda$. The photon flux (photons/$cm^2$-sec) at a depth x from the surface is given by $P(x)=P_o e^{-\alpha x}$, where $P_o$ is the transmitted flux at the surface, x is the depth from the surface and e is 2.7182818285. At one depth from the surface the intensity of a particular wavelength has fallen to 1/e or 37% of the intensity on the surface. The photons which are less energetic than the bandgap pass through the material. For crystalline silicon, the skin depth of the blue end of the spectrum is much shorter than at the red end of the spectrum ($1/\alpha=0.00096$ um at $\lambda=0.4$ um versus $5\times10^6$ cm at $\lambda=1.4$ um). Silicon very strongly absorbs in the ultraviolet and is essentially transparent in the infrared. Even at the visible limits of the solar spectrum the skin depth values range from 0.1 um to 5.3 um. ($\lambda=0.4$ um to 0.7 um). As a comparison, the photoactive layer in a CIS (copper indium diselenide) solar cell is about 2 um of $CuInSe_2$ and the photoactive layer of CdTe on a CdTe solar cell is about 6 um thick. From the above discussion it can be noted that a semiconductor layer or particle of not larger than 10 um is all that is required to convert light into an electric charge. Larger depths or particle sizes will act to dissipate the charge over a wider area, thus lessening the potential to destroy a VOC molecule coming into the vicinity of the point charge.

Although the use of anatase titanium dioxide has been noted as an efficient catalyst for the destruction of VOCs in the presence of ultraviolet light. It has not been appreciated that the destruction of VOCs is due to the semiconductor properties of the titanium dioxide. Therefore, it is possible to destroy VOCs using a wide range of semiconductor materials as a catalyst. These materials can include naturally occurring chalcopyrites, synthetic chalcopyrites, CdTe, CdS, $CuInSe_2$, CuS, $FeS_2$, $CuFeS_2$, Si, GaAs, GaSb, GaPS, ZnS, GaInP, and $As_2S_3$. Even scrap silicon, or other photoactive materials such as CdTe, CuInSe2, GaAs or GaSb, from semiconductor and photovoltaic manufacture can be used as a catalyst. Light sources outside of the UV range can also be utilized with the proper choice of catalyst. The light sources can be sunlight, visible light and even infrared light.

An additional advantage to having small particle size of the catalyst is the natural adhesion force associated with small particles. When small particles are applied to a substrate, the particles will adhere naturally to the substrate without the use of any adhesives or further treatment. This effect is observable, for example, when a car is coated with a fine layer of dust. The dust will not be removed from the smooth finish of the car no matter how fast the car is moving. The adhesion force cannot be overcome by the velocity of the air stream passing over the surface of the car. It should also be noted that the air stream passing over the car is under laminar flow of the air near the immediate surface of the car.

Figure 7:
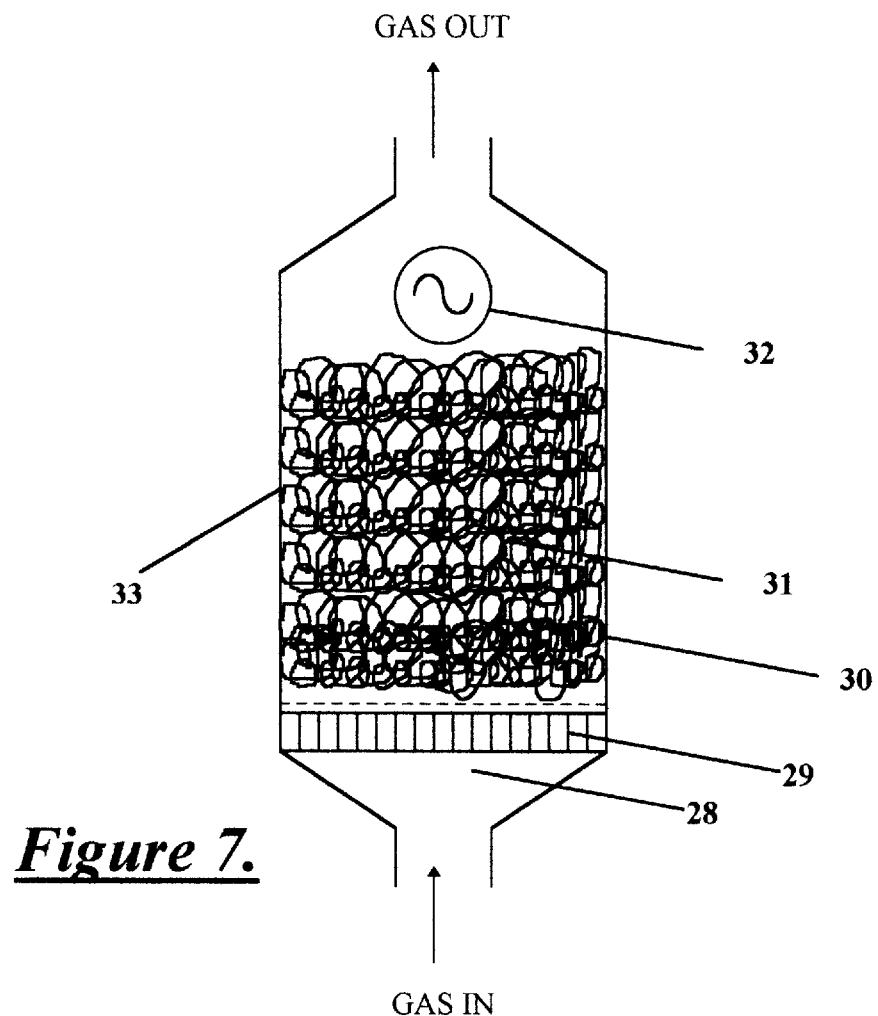
FIG. 7 shows an embodiment of the invention where the gas stream is irradiated inside a chamber packed with light transmitting fibers coated with a semiconductor catalyst.

In order for the catalyst to be more efficiently irradiated by the light passing through the tube, 22, in FIG. 5 or the glass or light transmitting fibers, 31, in FIG. 7 of the invention, it is advantageous to have the catalysts particle imbedded into the tube or wool so that a substantial portion of the particle surface is directly irradiated. It is also important that a substantial portion of the catalyst particle is still in contact with the gas stream. This can be accomplished by packing the tube with the powdered catalyst, raising the temperature to the sintering temperature of the catalyst or the softening point of the glass or quartz, and finally slowly lowering the temperature of the tube so that the tube is tempered. After the tube is cooled back to room temperature, the excess catalyst can be removed from the tube. Similarly, the light transmitting fibers, which can be made of quartz wool, glass wool or polymer, can be contacted or coated with the powdered catalyst, followed by raising the temperature to the sintering temperature of the catalyst or the softening point of the polymer, glass or quartz, and finally slowly lowering the temperature.

Figure 6:
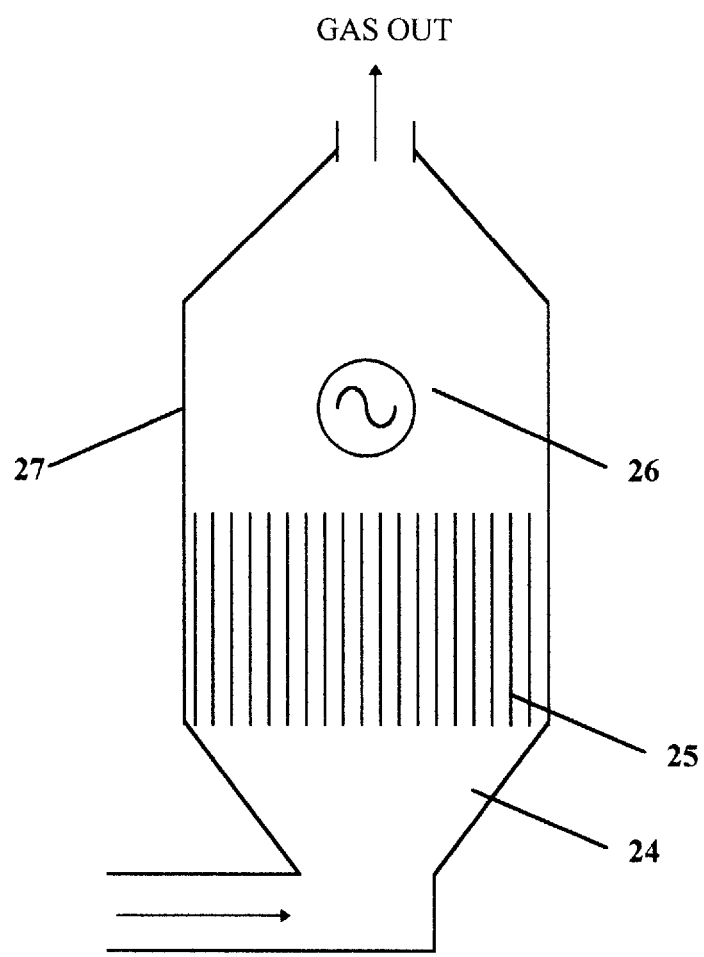
FIG. 6 shows an embodiment of the invention wherein the photocatalytic reactor contains a manifold of light transmitting tubes bonded with a catalyst.

FIG. 6 shows a manifold of the tubes mounted in the photocatalytic reactor. The gas streams enters the reactor and enters the plenum, 24. From the plenum, the gas stream enters a manifold, 25, comprising a plurality of the light transmitting tubes. The light transmitting tubes are coated with a catalyst as has been described. The outer surfaces of the tubes are in contact in each other to better enable the transmission of light throughout the manifold structure. The manifold of tubes, besides functioning as the reaction chamber, also serves to induce laminar flow in the gas stream. The manifold of glass tubes is irradiated by an ultraviolet lamp, 26, in a fashion so that the light is transmitted throughout the length of the tubes. This is accomplished by adjusting the angle of the lamp aperture with respect to the tubes or any other appropriate method such as fiber optic transmission of light to the manifold. If sunlight is to be used to illuminate the manifold, then the photocatalytic reactor housing, 27, will have a window or be constructed by a transparent material such as plastic, glass or quartz.

It should be noted that the reactor configuration shown in FIG. 6 can also be used to remove VOCs from aqueous streams. The limiting factor is the approximately ⅛ inch effective penetration of ultraviolet light into water. When the tube is kept at approximately ¼ inch inner diameter or less, then the invention will be effective in removing VOCs from aqueous streams. When light, such as visible light, is used, then the diameter of the tube may be increased somewhat. It must be noted that all light has a limited ability to penetrate through water, and the most effective results will occurs at narrower tube diameters.

FIG. 7 shows the destruction of VOCs in a fibrous bed configuration. A VOC laden air stream is introduced into a plenum, 28, where the air stream flows through a plurality of tubes, 29, to induce laminar flow conditions. The air stream exits from tubes and enters the glass or light transmitting fibers 31, through a gas distributor, 30. The gas distributor can have a number of configurations, such as concentric rings in the same plane, concentric rings in the form of a cone, grids of T-bars or other structural shapes, flat metal perforated plates, and dished or perforated plates concave both upward or downward. An alternative to the slotted disc would be a layer of filter medium. A porous stainless steel filter medium such as that manufactured by Pall Corporation would be preferred since stainless steel does not degrade in the presence of ultraviolet light. Other filter media which can be used include those composed of ultraviolet resistant polymers such as tetrafluorethylene fluorocarbon polymers, PVDF, and polypropylene. The total pressure drop across the gas distributor should be at least 30% of the total bed pressure drop.

Referring to FIG. 7, the fibrous bed, 31, comprises light transmitting fibers to which catalyst particles are bonded or embedded. The light transmitting fibers is made of either glass or preferably quartz, both of which are commercially available. The catalyst can be applied to the light transmitting fibers via one of the methods already described. The light transmitting fiber matrix offers a high surface area, and is particularly amenable by having the catalyst applied by dusting with fine particles, which will then adhere by adhesion forces. Quartz is the preferred material for the light transmitting fibers due to its superior ability to transmit ultraviolet light.

Referring to FIG. 7, The light transmitting fibers, 31, are irradiated by an ultraviolet lamp, 32, at one of the commercially available ultraviolet frequencies, which can include sources at 215 nm, 254 nm, or 650 nm. An alternative to the ultraviolet lamp would be to manufacture the housing, 33, of the photocatalytic reactor from a transparent material so that sunlight or some other source of radiant energy can be utilized. Many of the catalysts are active at visible and even infrared wavelengths, and it is possible to use many different types of light sources. The housing can be made of material transparent to ultraviolet light such as quartz or an appropriate polymer. Borosilicate glass can also be used. Since this invention will be used on the rooftops of dry cleaners, restaurants and other small businesses producing VOCs, it is rational to utilize every available source of ultraviolet radiation. The fibrous bed should be sufficiently large with respect to the gas flow rate to provide adequate residence time for the destruction of the VOCs in the gas stream. The purified gas stream will then exit the a packed bed. Pretreatment and post-treatment of the gas stream is the same as described elsewhere in the specification.

Figure 8:
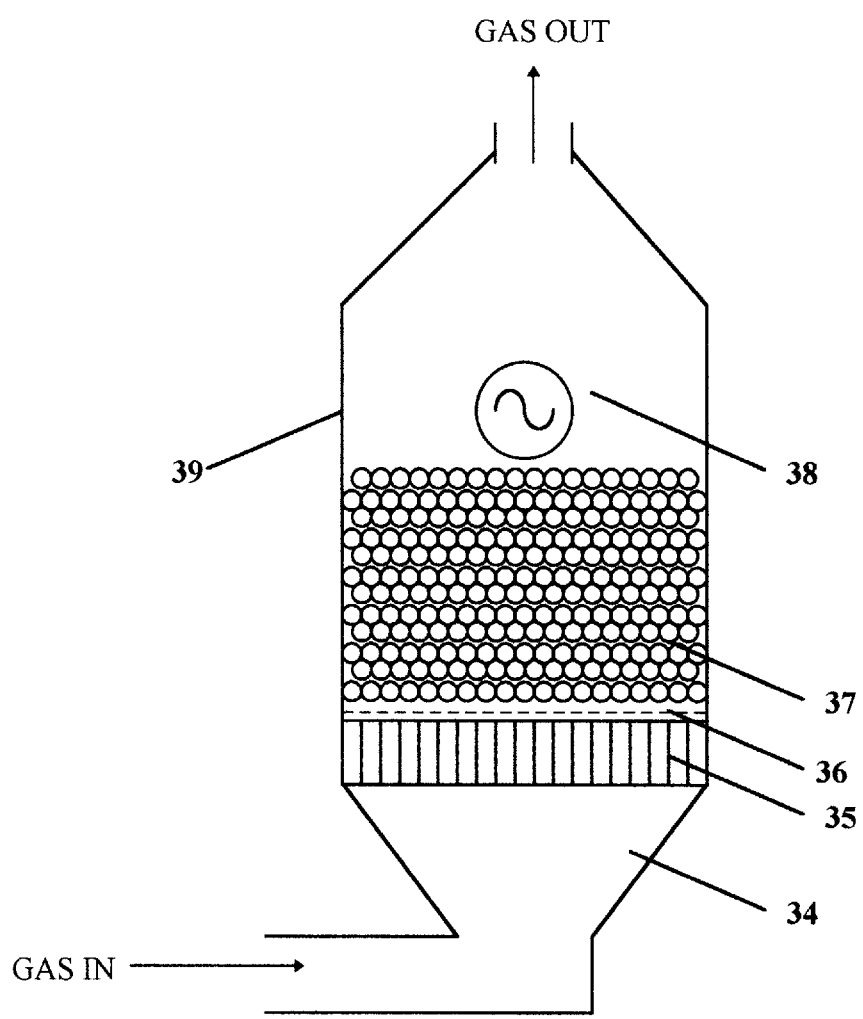
FIG. 8 shows an embodiment of the invention where the gas stream is irradiated inside a chamber packed with light transmitting beads coated with a semiconductor catalyst.

FIG. 8 shows the destruction of VOCs in a packed bed configuration. A VOC laden air stream is introduced into a plenum, 34, where the air stream flows through a plurality of tubes, 35, to induce laminar flow conditions. The air stream exits from tubes and enters the packed bed, 37, through a gas distributor, 36. The gas distributor can have a number of configurations, such as concentric rings in the same plane, concentric rings in the form of a cone, grids of T-bars or other structural shapes, flat metal perforated plates, and dished or perforated plates concave both upward or downward. An alternative to the slotted disc would be a layer of filter medium. A porous stainless steel filter medium such as that manufactured by Pall Corporation would be preferred since stainless steel does not degrade in the presence of ultraviolet light. Other filter media which can be used include those composed of ultraviolet resistant polymers such as tetrafluorethylene fluorocarbon polymers, PVDF, and polypropylene. The total pressure drop across the gas distributor should be at least 30% of the total bed pressure drop.

Referring to FIG. 8, the packed bed, 37, comprises light transmissive beads to which catalyst particles are bonded or embedded. The beads must have a diameter larger than the size of the openings in the gas distributor, 36. The beads must also be in physical contact with one another so that light can be transmitted from one bead to the next through the solid matrix. The catalyst can be applied to the beads via one of the methods already described. However in this embodiment it would be advantageous to heat the beads until they become physically bonded to each other. The temperature required for this will vary depending on if the beads are made from polymer, glass or quartz. Quartz is the preferred material for the beads due to its superior ability to transmit ultraviolet light.

Referring to FIG. 8, the packed bed, 37, is irradiated by an ultraviolet lamp, 38, at one of the commercially available ultraviolet frequencies, which can include sources at 215 nm, 254 nm, or 650 nm. An alternative to the ultraviolet lamp would be to manufacture the housing, 39, of the packed bed from a transparent material so that sunlight or some other source of radiant energy can be utilized. Many of the catalysts are active at visible and even infrared wavelengths, and it is possible to use many different types of light sources. The housing can be made of material transparent to ultraviolet light such as quartz or an appropriate polymer. Borosilicate glass can also be used. Since this invention will be used on the rooftops of dry cleaners, restaurants and other small businesses producing VOCs, it is rational to utilize every available source of ultraviolet radiation. The packed bed should be sufficiently large with respect to the gas flow rate to provide adequate residence time for the destruction of the VOCs in the gas stream. The purified gas stream will then exit the a packed bed. Pretreatment and post-treatment of the gas stream is the same as described elsewhere in the specification.

In all the embodiments of the invention where the gas stream is air or contains oxygen there is a possibility that ozone may be generated when ultraviolet is used to irradiate the catalyst. The formation of ozone can be minimized or prevented by several means. Using ultraviolet light which is not the "ozone producing wavelength" of approximately 215 nanometers, will be effective. Lowering the intensity of the ultraviolet light will also be effective, but the residence time of the gas stream in the photocatalytic reactor will probably need to be increased. Post-treatment of the gas stream leaving the photocatalytic reactor will also be effective in removing any residual ozone. Post-treatment can include passing the gas stream through a ozone destroying bed of activated carbon, silica, or a proprietary catalyst such as those manufactured by Engelhard Corp., Iselin, N.J. The post-treatment option is the preferred option because the presence of ozone in the photocatalytic reactor will play a positive role in the photocatalytic destruction of VOCs.

One of the great advantages of the invention is the ability for the embodiments shown in FIGS. 3 through 8 to operate in a passive fashion wherein there are no moving parts. In the embodiments excluding the fluidized bed, where a definite flow rate range will be required to maintain the bed fluidization, even minimal flows will be effectively treated by the photocatalytic reactor. In a small point source generator such as a restaurant, the warm VOC laden air stream from the cooking area will be carried to a photocatalytic reactor located on the roof of the building by convection forces. If the photocatalytic reactor is solar powered, it is totally cost free to operate, requiring no reagents, no electricity and no maintenance besides an occasional cleaning to optimize light transmission through the transparent housing. Since many restaurants and other small point source VOC emitters only are open during daylight hours, the passive reactor will be sufficient to fulfill their VOC abatement needs. A passive reactor fitted with a lamp will consume some electricity and require an occasional change out of the lamp bulb, but it will still be a very low maintenance means for VOC abatement. Hybrid photocatalytic reactor utilizing a combination of sunlight and lamp generated light are also a possible arrangement.

The invention disclosed here will also be effective in converting CO to $CO_2$, which may be an important advantage when the VOC source is a restaurant or bakery where the off-gas source is an oven. Therefore CO is also defined as VOC.

SUMMARY, RAMIFICATIONS AND SCOPE

Accordingly, this invention discloses a method to remove VOCs from a gas or air stream. The preferred method is to use ultraviolet light irradiate the gas stream in intimate contact with a semiconductor catalyst for sufficient time to destroy the VOC burden of the gas stream A virtually complete removal of the VOCs is attained, and the off-gas is free of any component which might contribute to the formation of photochemical smog. The invention can be practiced on a small scale to treat gaseous effluent streams emanating from dry cleaning establishments, restaurants, microbreweries, paint spray booths and other small generators of VOCs.

Although the description above contains many specificities, these should not be construed as limiting the scope of the invention but as merely providing illustrations of some of the presently preferred embodiments of this invention. Thus the scope of the invention should be determined by the appended claims and their legal equivalents.

I claim:

1. A method for eliminating volatile organic carbons from a gas stream which comprises:
   inducing laminar flow in the gas stream, wherein inducing the laminar flow is accomplished in a plenum packed with a plurality of tubes;
   drying the gas stream;
   contacting the gas steam with a catalyst; and
   irradiating the catalyst with a source of light.

2. A method according to claim 1 wherein the catalyst is a semiconductor catalyst.

3. A method according to claim 1 wherein the catalyst is one or a mixture of catalysts selected from the group consisting of $TiO_2$, naturally occuring chalcopyrites, synthetic chalcopyrites, CdTe, CdS, $CuInSe_2$, CuS, $FeS_2$, $CuFeS_2$, Si, GaAs, GaSb, GaPs, ZnS, GAInP, $As_2S_3$, zirconium oxide, antimony oxide, zinc oxide, stannic oxide, cerium oxide, tungsten oxide, hematite, goethite, and barium titanate.

4. A method according to claim 1 wherein the source of light is selected from the group consisting of sunlight and ultraviolet light.

5. A method according to claim 1 further comprising cooling the gas stream prior to contacting the gas stream with the catalyst.

6. A method according to claim 1 further comprising contacting the catalyst with the gas stream in a fluidized bed.

7. A method according to claim 6 further comprising flowing the gas stream into a cyclone located downstream from the fluidized bed, said cyclone having a gas outlet and a solids outlet connected to the fluidized bed.

8. A method according to claim 6 further comprising flowing the gas stream through a first layer of filtration media located downstream of the fluidized bed and a second layer of filtration media located upstream of the fluidized bed, said layers of filtration media retaining the catalyst inside the fluidized bed.

9. A method according to claim 1 wherein contacting the gas stream with the catalyst is accomplished by passing the gas stream through a chamber packed with light transmitting fibers coated with the catalyst and irradiating the light transmitting fibers with ultraviolet light.

10. A method according to claim 9 wherein the light transmitting fibers are selected from the group consisting of glass, quartz, acrylic polymer and methacrylic polymer.

11. A method according to claim 9 wherein the laminar flow is induced by passing the gas stream is passed through a plenum packed with a plurality of tubes prior to the chamber.

12. A method according to claim 1 wherein the catalyst is bonded to a plurality of light transmissive beads, said plurality of light transmissive beads being in a packed bed.

13. A method for eliminating volatile organic carbons form a gas stream which comprises: inducing laminar flow in the gas stream; contacting the gas stream with a catalyst, said contacting accomplished by flowing the gas stream through a plurality of light transmitting tubes having the catalyst bonded to the surface of each of said light transmitting tubes; and irradiating the catalyst with a source of light.

14. A method according to claim 13 wherein the catalyst is bonded to each of said light transmitting tubes by contacting catalyst particles with each of said light transmitting tubes; raising the temperature to where the catalyst sinters to form a bond to each of said light transmitting tubes; and lowering the temperature at a rate to assure each of said light transmitting tubes are adequately tempered.

15. A method according to claim 13 wherein the catalyst is bonded to the surface of each of said light transmitting tubes by dissolving the catalyst in a nitric acid solution, contacting the nitric acid solution with each of said light transmitting tubes, and evaporating the nitric acid to leave a uniform layer of catalyst on the each of said light transmitting tubes.

16. A method according to claim 13 wherein the catalyst is bonded to the surface of each of said light transmitting tubes utilizing chemical vapor deposition.

17. A method according to claim 13 wherein each of said light transmitting tubes consist of quartz.

18. A method according to claim 13 wherein light is transmitted through each of said light transmitting tubes by connecting the tubes to a light source with fiber optic connections.

19. A method according to claim 13 wherein light is transmitted through each of said light transmitting tubes by projecting a light source at each of said light transmitting tubes at an angle of incidence which causes the light to be transmitted through the body of each of said light transmitting tubes.

20. A method according to claim 13 further comprising drying the gas stream prior to contacting the gas stream with the catalyst.

21. A method for eliminating volatile organic carbons from a flowing gas stream which comprises:
    controlling the flow of the gas stream;
    cooling the gas stream;
    drying the gas stream;
    passing the gas stream through a plurality of tubes to induce laminar flow in the gas stream;
    contacting the gas stream with a semiconductor catalyst in a fluidized bed; irradiating the fluidized bed with a source of light;
    recovering entrained catalyst particles from the gas stream; and
    returning the recovered particles to the fluidized bed.

22. A method for eliminating volatile organic carbons from a flowing gas stream which comprises:
    controlling the flow of the gas stream;
    cooling the gas stream;
    drying the gas stream;
    passing the gas stream through a plurality of tubes to induce laminar flow in the gas stream;
    routing the gas stream through a plurality of light transmitting tubes having a semiconductor catalyst adhering to the surface of the tubes, wherein the semiconductor catalyst is bonded to each of said light transmitting tubes by contacting the semiconductor particles with the tubes, heating each of said light transmitting tubes to a temperature where the catalyst sinters to form a bond to the tubes, and lowering the temperature at a rate to assure the tubes are adequately tempered; and
    irradiating the light transmitting tubes with a source of light.

* * * * *